(12) United States Patent
Boulanger

(10) Patent No.: US 9,845,075 B2
(45) Date of Patent: Dec. 19, 2017

(54) WINDSCREEN WIPER DEVICE

(75) Inventor: Olivier Boulanger, Etalle (BE)

(73) Assignee: Federal-Mogul S.A., Aubange (BE)

( * ) Notice: Subject to any disclaimer, the term of this patent is extended or adjusted under 35 U.S.C. 154(b) by 485 days.

(21) Appl. No.: 14/129,487

(22) PCT Filed: Jun. 28, 2011

(86) PCT No.: PCT/EP2011/060779
§ 371 (c)(1),
(2), (4) Date: Jun. 3, 2014

(87) PCT Pub. No.: WO2013/000502
PCT Pub. Date: Jan. 3, 2013

(65) Prior Publication Data
US 2014/0289990 A1    Oct. 2, 2014

(51) Int. Cl.
*B60S 1/38*    (2006.01)

(52) U.S. Cl.
CPC ........... *B60S 1/3849* (2013.01); *B60S 1/3858* (2013.01); *B60S 1/3808* (2013.01); *B60S 1/3877* (2013.01)

(58) Field of Classification Search
CPC .... B60S 1/3858; B60S 1/3856; B60S 1/3849; B60S 1/3851; B60S 1/3853; B60S 1/3808
USPC ....................................... 15/250.32, 250.452
See application file for complete search history.

(56) References Cited

U.S. PATENT DOCUMENTS

| 2004/0111820 A1* | 6/2004 | Aoyama | B60S 1/381 15/250.201 |
| 2007/0113366 A1* | 5/2007 | Walworth | B60S 1/3856 15/250.32 |
| 2008/0263809 A1* | 10/2008 | Bousset | B60S 1/386 15/250.32 |
| 2009/0056049 A1 | 3/2009 | Jarasson et al. | |

FOREIGN PATENT DOCUMENTS

| DE | 10043426 A1 | 3/2002 |
| DE | 10058208 A1 | 7/2002 |
| DE | 20220355 U1 | 4/2004 |
| FR | 2868376 A1 | 10/2005 |
| WO | WO-2010016000 A1 | 2/2010 |
| WO | 2012139645 A1 | 10/2012 |

* cited by examiner

*Primary Examiner* — Andrew A Horton
(74) *Attorney, Agent, or Firm* — Robert L. Stearns; Dickinson Wright, PLLC

(57) ABSTRACT

A windscreen wiper device of the flat blade type, comprising a carrier element, as well as a wiper blade of a flexible material, wherein the wiper blade includes at least one longitudinal groove, in which groove at least one longitudinal strip of the carrier element is disposed, which windscreen wiper device comprises a connecting device for an oscillating arm, wherein the connecting device is connected to the flexible material of the wiper blade by at least one pin of a first type and/or at least one pin of a second type, and wherein at least one of the pins is movable from a first position, wherein the pin in a premounted position is fixed to the connecting device, into a second position, and wherein the pin in a mounted position as a single constructional element is interconnecting the connecting device and the flexible material of the wiper blade.

11 Claims, 9 Drawing Sheets

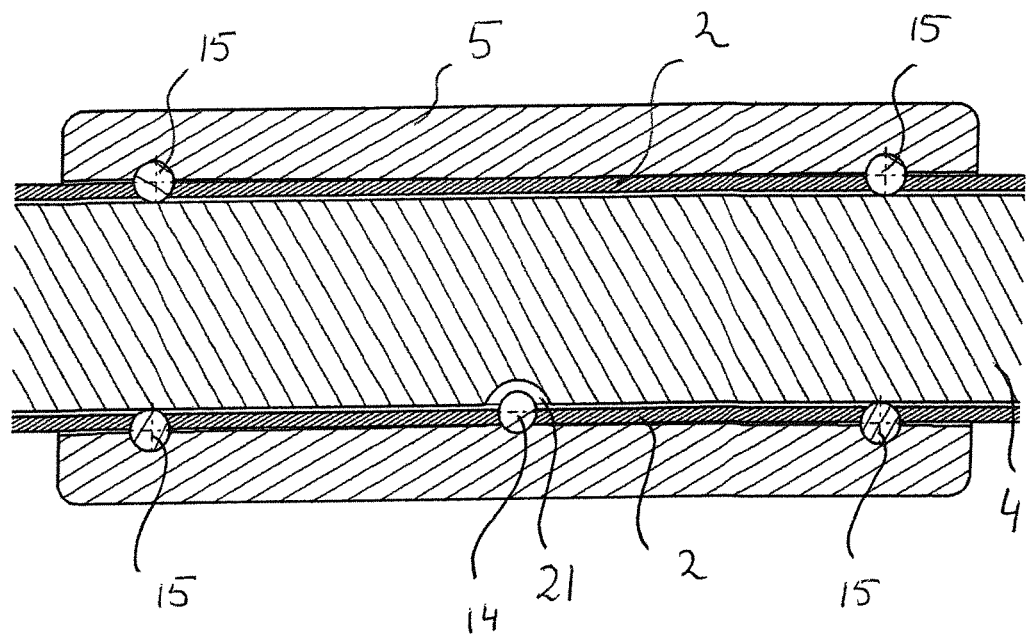
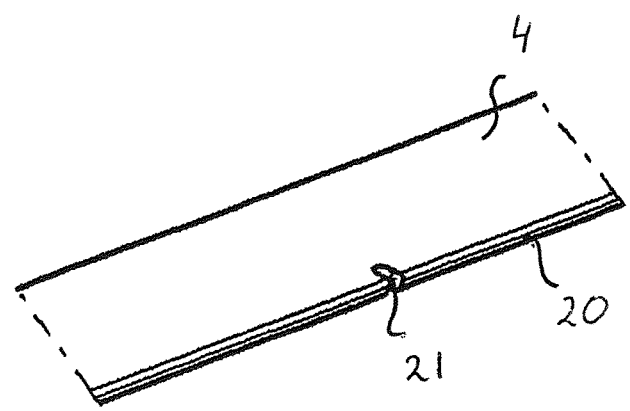
Fig.5

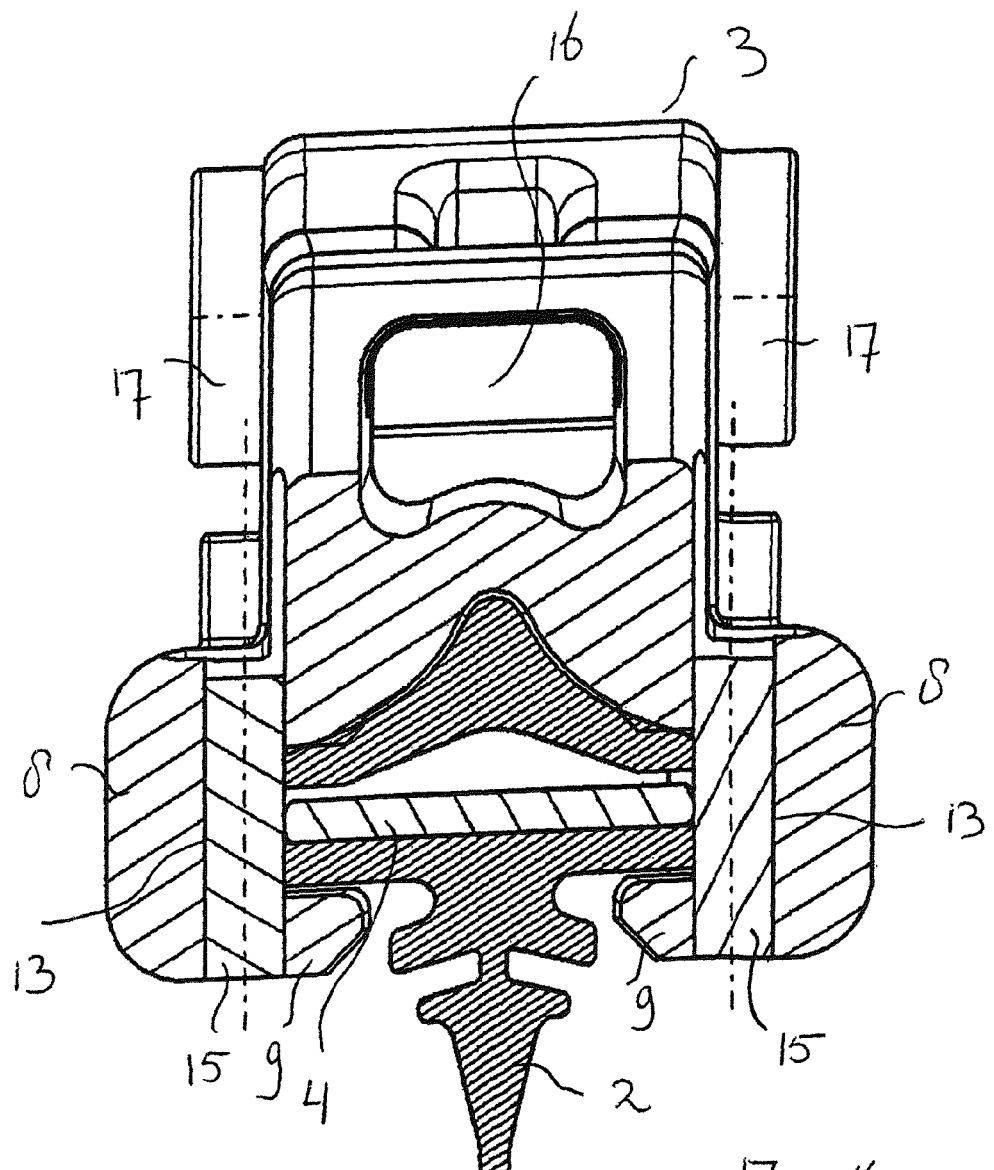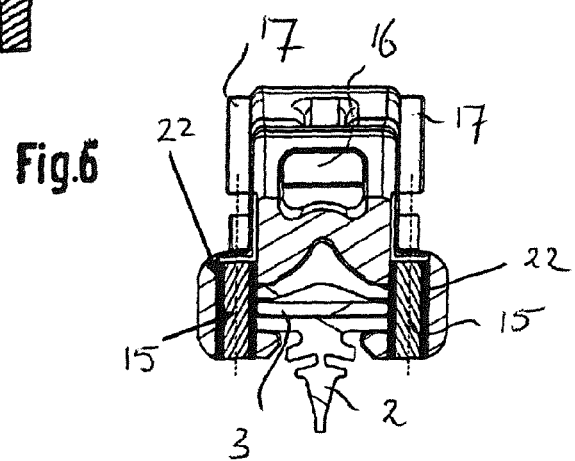
Fig.6

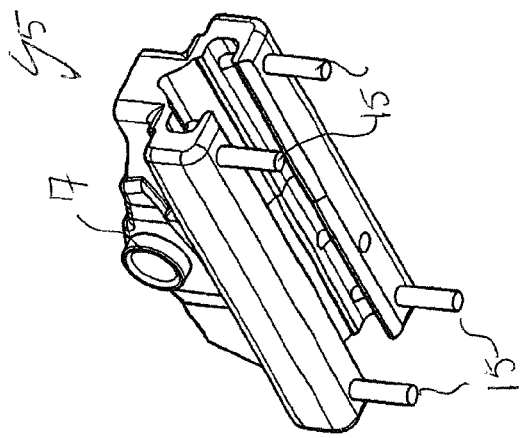
Fig.9
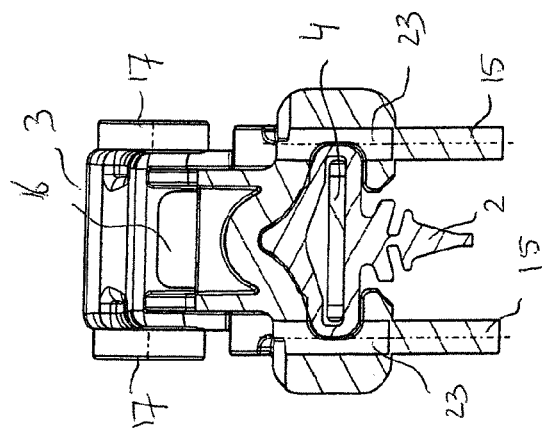
Before
Fig.10
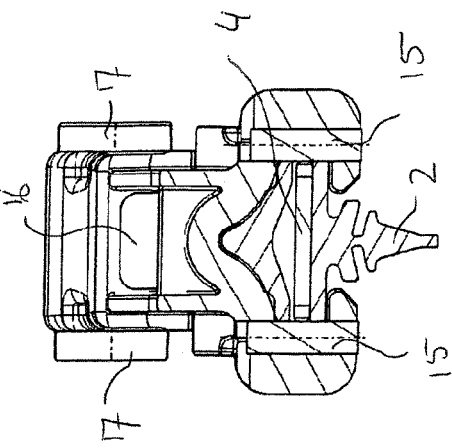
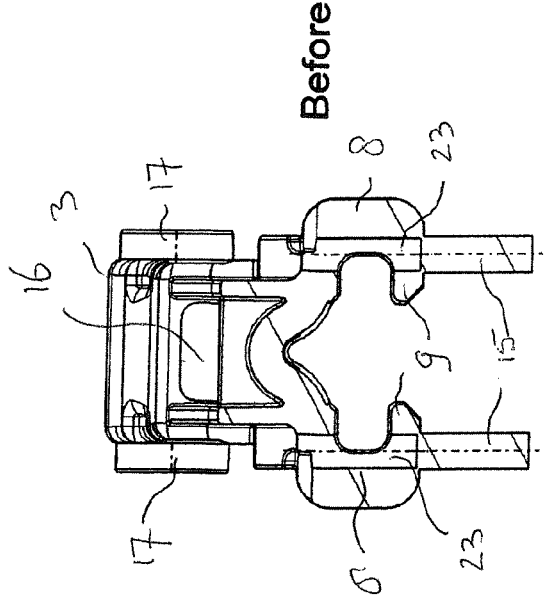
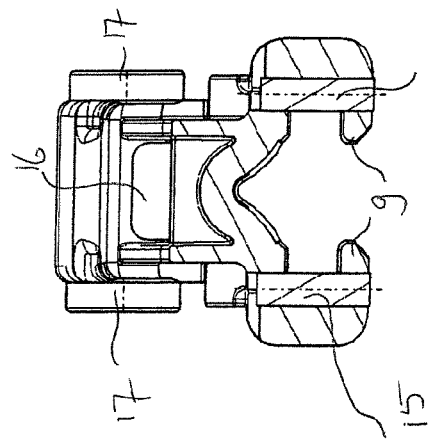
After
Fig.11 dimensions# WINDSCREEN WIPER DEVICE

BACKGROUND OF THE INVENTION

1. Technical Field

The present invention relates to a windscreen wiper device of the flat blade type, particularly for automobiles, comprising an elastic, elongated carrier element, as well as an elongated wiper blade of a flexible material, which can be placed in abutment with a windscreen to be wiped, which wiper blade includes at least one longitudinal groove, in which groove at least one longitudinal strip of the carrier element is disposed, which windscreen wiper device comprises a connecting device for an oscillating arm, wherein the oscillating arm can be pivotally connected to the connecting device about a pivot axis near one end thereof. Particularly, the oscillating arm can be pivotally connected to the connecting device with the interposition of a joint part. More in particular, the wiper blade comprises a spoiler at a side thereof facing away from the windscreen to be wiped. the longitudinal groove is preferably a central longitudinal groove accommodating the longitudinal strip. the longitudinal strip is also called a "flexor", while the connecting device is also indicated as a "connector". In the framework of the present invention the connector is preferably made in one piece, also called a "one piece connector".

2. Related Art

Such a windscreen wiper device is generally known. This prior art windscreen wiper device is designed as a so-called "flat blade" or "yokeless blade", wherein no use is made of several yokes pivotally connected to each other, but wherein the wiper blade is biased by the carrier element, as a result of which it exhibits a specific curvature. The spoiler is also called an "air deflector".

SUMMARY OF THE INVENTION

The object of the invention is to provide an improved windscreen wiper device.

In order to accomplish that objective, a windscreen wiper device of the type referred to in the introduction is characterized according to the invention in that the connecting device is connected to the flexible material of the wiper blade by at least one pin of a first type and/or at least one pin of a second type, wherein the pin of the first type cooperates with a recess provided along an exterior edge of the longitudinal strip in order to block any movement of the wiper blade in longitudinal direction thereof relative to the longitudinal strip at the location of the interconnection of the connecting device and the wiper blade; and the pin of the second type is mounted through the flexible material of the wiper blade at the location of the interconnection of the connecting device and the wiper blade in order to block any lateral movement of longitudinal strip at the location of the interconnection of the connecting device and the wiper blade, and wherein at least one of the pins is movable from a first position, wherein the pin in a pre-mounted position is fixed to the connecting device, into a second position, wherein the pin in a mounted position as a single constructional element is interconnecting the connecting device and the flexible material of the wiper blade.

Advantageously, at least two pins of the first type are provided on opposite sides of the longitudinal strip, wherein the pins of the first type are preferably located opposite one another. In other words, the pin of the first type ensures that the wiper blade and the longitudinal strip are not allowed to mutually move under the connecting device, but particularly in all other areas along the wiper blade a slight movement thereof is made possible in order to allow the wiper blade to follow any curvature of the windscreen to be wiped.

It is this interaction between the pin of the first type and the wiper blade that elastomeric material (i.e. usually rubber) of the wiper blade and material of the longitudinal strip (i.e. usually steel) are forced to engage with each other in a locking manner when the connecting device is finally mounted onto the wiper blade, all at the location under the connecting device. The pin of the first type is mounted inside the recess by stamping the pin of the first type through the flexible material of the wiper blade and inside the recess. The pin of the second type ensures that the so-called "fishtailing phenomenon" is avoided at all times.

The wiper blade at the location outside the connecting device would normally suffer from this "fishtailing phenomenon", wherein the wiper blade on opposite sides of the connecting device vibrates in an uncontrollable manner parallel to the windscreen to be wiped. The "fishtailing phenomenon" results in deteriorated wiping properties, with all negative consequences involved, particularly at high speeds.

The deformation by the pin of the second type is realized at the time of mounting the connecting device onto the wiper blade during assembly of all relevant parts of the wiper blade, wherein the deformation is particularly effected in a side region of the wiper blade, without having any influence on a bottom region thereof (i.e. containing a wiping lip of the wiper blade). Consequently, wiping properties of the wiper blade are not adversely affected.

It is noted that the present invention is not restricted to the use of only one longitudinal strip forming the elastic carrier element that is particularly located in a central longitudinal groove of the wiper blade. Instead, the carrier element may also comprise two longitudinal strips, wherein the strips are disposed in opposite longitudinal grooves of the wiper blade. The groove (s) may be closed at one outer end.

In a preferred embodiment of a windscreen wiper device in accordance with the invention the pin can be pressed from the first position into the second position.

In another preferred embodiment of a windscreen wiper device according to the invention in the first position the pin and the connecting device are made in one piece.

In another preferred embodiment of a windscreen wiper device in accordance with the invention the connecting device comprises a guiding channel for guiding the pin from the first position into the second position. Preferably, the guiding channel extends in a direction at least substantially perpendicular to the windscreen to be wiped.

In another preferred embodiment of a windscreen wiper device according to the invention the pin in a pre-mounted position is fixed to the connecting device near a free end of the guiding channel.

In another preferred embodiment of a windscreen wiper device in accordance with the invention the connecting device has a substantially U-shaped cross-section, wherein free ends of legs of the U-shaped cross-section extend inwardly so as to form grooves for receiving longitudinal sides of the wiper blade, and wherein the free ends are provided with the guiding channels for guiding the pin.

In another preferred embodiment of a windscreen wiper device according to the invention the connecting device is connected to the flexible material of the wiper blade by one pin of the first type interconnecting the connecting device and the wiper blade near the middle longitudinal plane of the connecting device perpendicular to the windscreen to be wiped and by two pairs of opposite pins of the second type interconnecting the connecting device and the wiper blade near the outer ends of the connecting device.

In another preferred embodiment of a windscreen wiper device in accordance with the invention the connecting device is connected to the flexible material of the wiper blade by one pair of opposite pins of the first type interconnecting the connecting device and the wiper blade near the middle longitudinal plane of the connecting device perpendicular to the windscreen to be wiped and by two pairs of opposite pins of the second type interconnecting the connecting device and the wiper blade near the outer ends of the connecting device.

In another preferred embodiment of a windscreen wiper device according to the invention the connecting device is connected to the flexible material of the wiper blade by one pair of opposite pins of the first type and by one pair of opposite pins of the second type interconnecting the connecting device and the wiper blade near the outer ends of the connecting device.

In another preferred embodiment of a windscreen wiper device in accordance with the invention the connecting device is connected to the flexible material of the wiper blade by two pairs of opposite pins of the first type interconnecting the connecting device and the wiper blade near the outer ends of the connecting device.

Preferably, the connecting device is pivotally connected to the oscillating arm with the interposition of a joint part, wherein the joint part is detachably connected to the connecting device by engaging protrusions of the connecting device, at the location of the pivot axis, in recesses provided in the joint part. This is preferably realized through a snapping or clipping operation. Particularly, the joint part has an at least substantially U-shaped cross-section at the location of its connection to the connecting device, wherein the joint part is provided with a recess provided coaxially with the pivot axis. In particular, the protrusions extend outwards on either side of the connecting device and are preferably cylindrical in shape. In the alternative, the protrusions are spherical or frusto-conical in shape. the protrusions that function as bearing surfaces are thus paced far apart, so that forces exerted thereon will be relatively low. In yet another preferred variant the joint part is provided with co-axial through holes in legs of the U-shaped cross-section thereof, wherein a pivot pin is inserted in the through holes.

The above-mentioned protrusions are preferably provided with co-axial through holes. Accordingly, the wiper blade may then be connected to the oscillating arm on the basis of a so-called "sidelock system". The oscillating arm is provided with a joint pin or a pivot pin to be inserted in the coaxial through holes. the pivot pin protrudes in a direction towards the wiper blade and has a pivot axis extending in a direction of the oscillating movement of the oscillating arm. In the alternative, the joint part comprises at least one resilient tongue engaging in a correspondingly shaped hole provided in a base of a U-shaped cross-section of the oscillating arm, and wherein the resilient tongue is rotatable along a hinge axis between an outward position retaining the wiper blade onto the oscillating arm and an inward position releasing the wiper blade from the oscillating arm. Accordingly, the wiper blade may then be connected to the oscillating arm on the basis of a so-called "toplock system" on the basis of a bayonet connection. In order to connect the wiper blade onto the oscillating arm, the resilient tongue is initially pushed in against a spring force—as if it were a push button—and then allowed to spring back into the hole provided in the oscillating arm, thus snapping, that is clipping the resilient tongue into the hole. By subsequently pushing in again the resilient tongue against the spring force, the wiper blade may be released from the oscillating arm.

It is noted that in the invention use is made of a mounting head fixed for rotation to a shaft, wherein the shaft is rotatable alternately in a clockwise and in a counterclockwise sense carrying the mounting head into rotation. Thus, in turn the mounting head draws the connecting device into rotation and thereby moves the wiper blade. In the alternative, the mounting head is fixed for translation to a carriage, wherein the carriage can be translated alternately in a one linear direction and in another counter linear direction carrying the mounting head into translation. The present invention can therefore be used for circular or linear movement of the mounting head.

An embodiment of the invention will now be explained more in detail with reference to figures illustrated in a drawing, wherein FIG. 1 is a perspective, schematic view of a preferred embodiment of a windscreen wiper device according to the invention, with a joint part;

FIG. 5 shows in detail a schematic view from below of the connecting device of FIG. 2, further elucidating the working principle of the mutual fixation of the wiper blade and the longitudinal strip at the location of the connecting device of FIG. 2 according the invention;

FIG. 6 is a cross-sectional view of the windscreen wiper device of FIG. 1 along the line A-A in FIG. 1;

Figure 8:
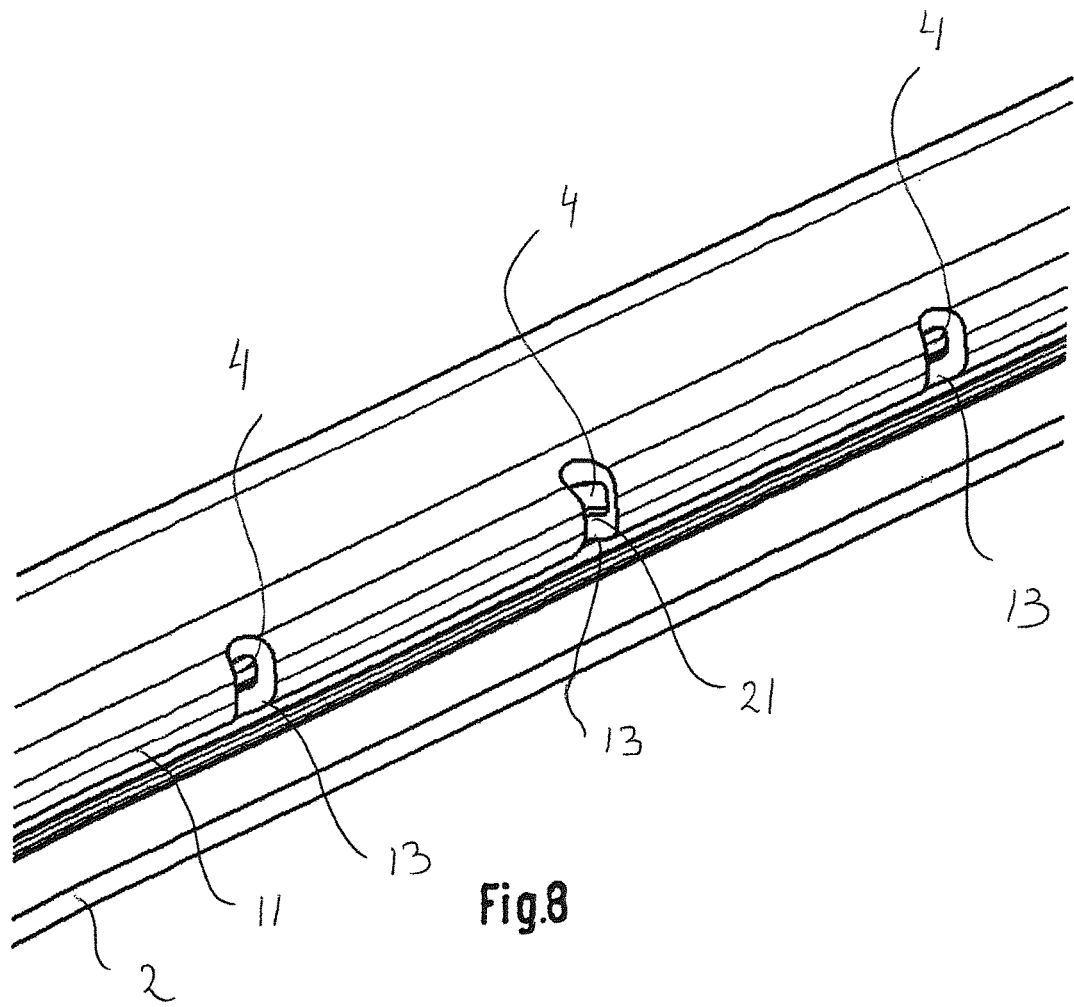

FIG. 8 shows in detail a schematic side view of a dissembled wiper blade, as used in FIG. 1; and FIG. 9 shows in detail a schematic view from below of the connecting device according to a second embodiment, as used in a windscreen wiper device of FIG. 1; and FIGS. 10 and 11 show a cross-section of the windscreen wiper device of FIG. 1 along the line A-A in FIG. 1, using the connecting device of FIG. 9, wherein pins are in an outward or inward position, respectively.

DETAILED DESCRIPTION

Figure 1:
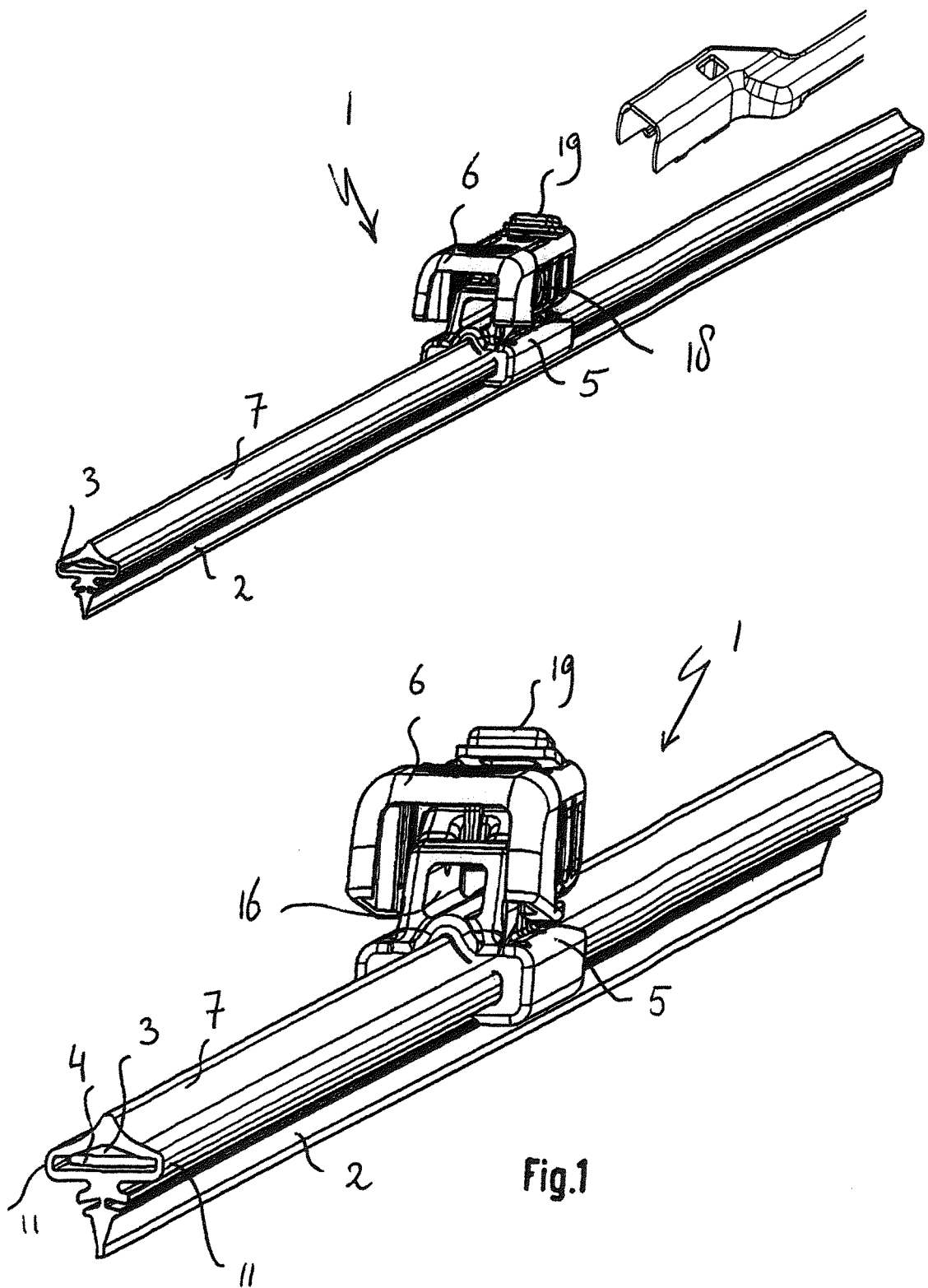
Figure 7:
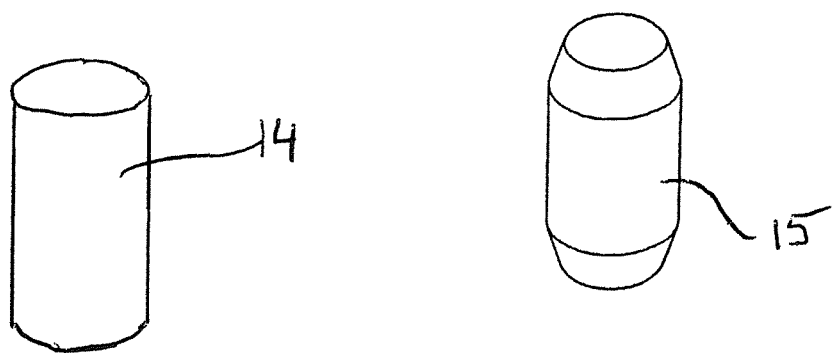
FIG. 7 is a schematic, perspective view of a pin, as used in fixating the wiper blade and the longitudinal strip at the location of the connecting device of FIG. 3.

FIG. 1 shows a preferred variant of a windscreen wiper device 1 according to the invention. The windscreen wiper device 1 is built up of an elastomeric wiper blade 2 comprising a central longitudinal groove 3, wherein a longitudinal strip 4 made of spring band steel is fitted in the longitudinal groove 3 (see FIGS. 5, 6 and 7). The strip 4 forms a flexible carrier element for the rubber wiper blade 2, as it were, which is thus biased in a curved position (the curvature in operative position being that of a windscreen to be wiped). The windscreen wiper device 1 is furthermore built up of a connecting device 5 of metal for connecting an oscillating wiper arm thereto (not shown), with the interposition of a joint part 6. The oscillating wiper arm is pivotally connected to the connecting device 5 about a pivot axis near one end. The preferred embodiment of FIG. 1 according to the invention comprises a spoiler or "air deflector" 7 which is made in one piece with the rubber wiper blade 2 and which extends along the entire length thereof.

Although not shown in FIG. 1, but fully understood by skilled person, the oscillating arm is connected to a mounting head fixed for rotation to a shaft driven by a small motor. In use, the shaft rotates alternately in a clockwise and in a counter-clockwise sense carrying the mounting head into rotation also, which in turn draws the oscillating arm into rotation and by means of the connecting device 5 moves the wiper blade 2.

Figure 2:
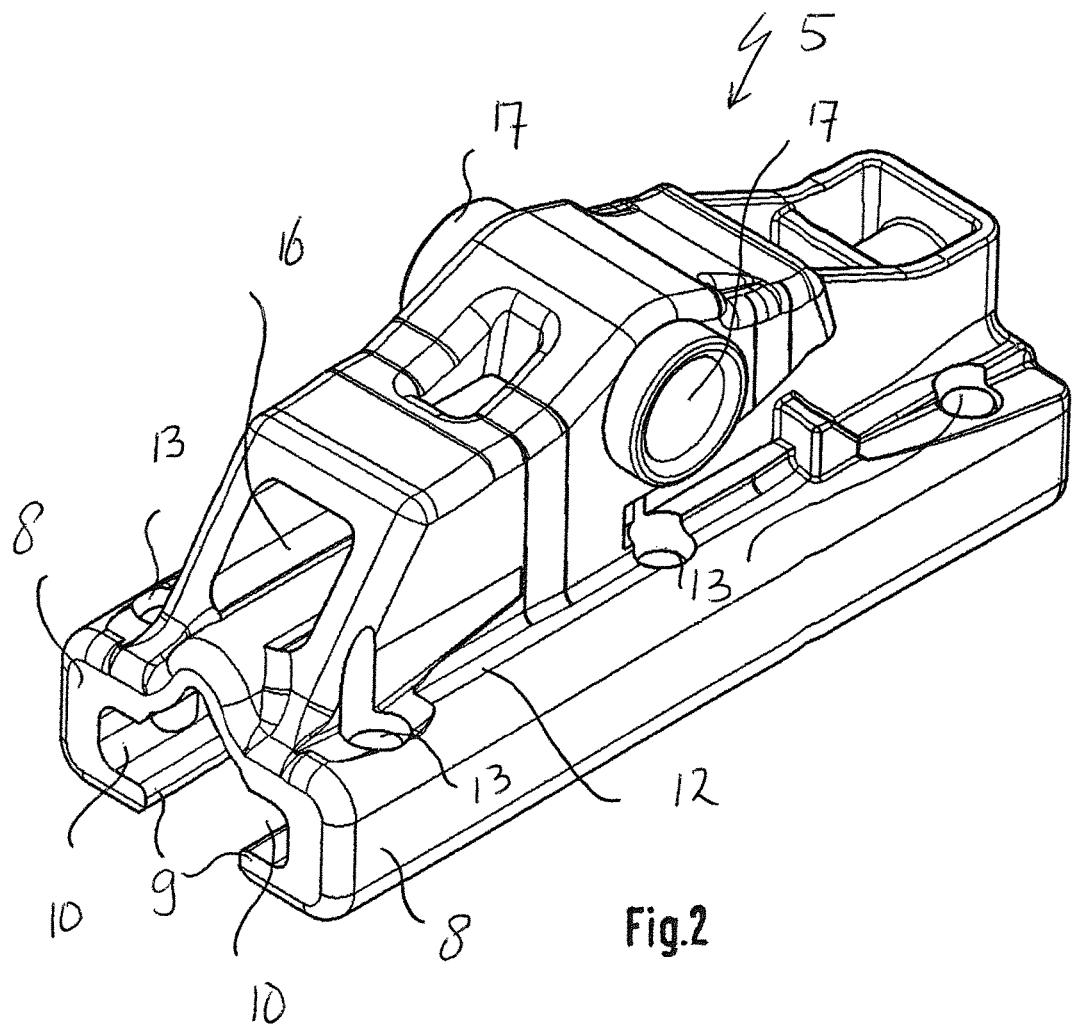
FIGS. 2 through 4 are several perspective, schematic views of a connecting device according to a first embodiment, as used in a windscreen wiper device of FIG. 1.
Figure 3:
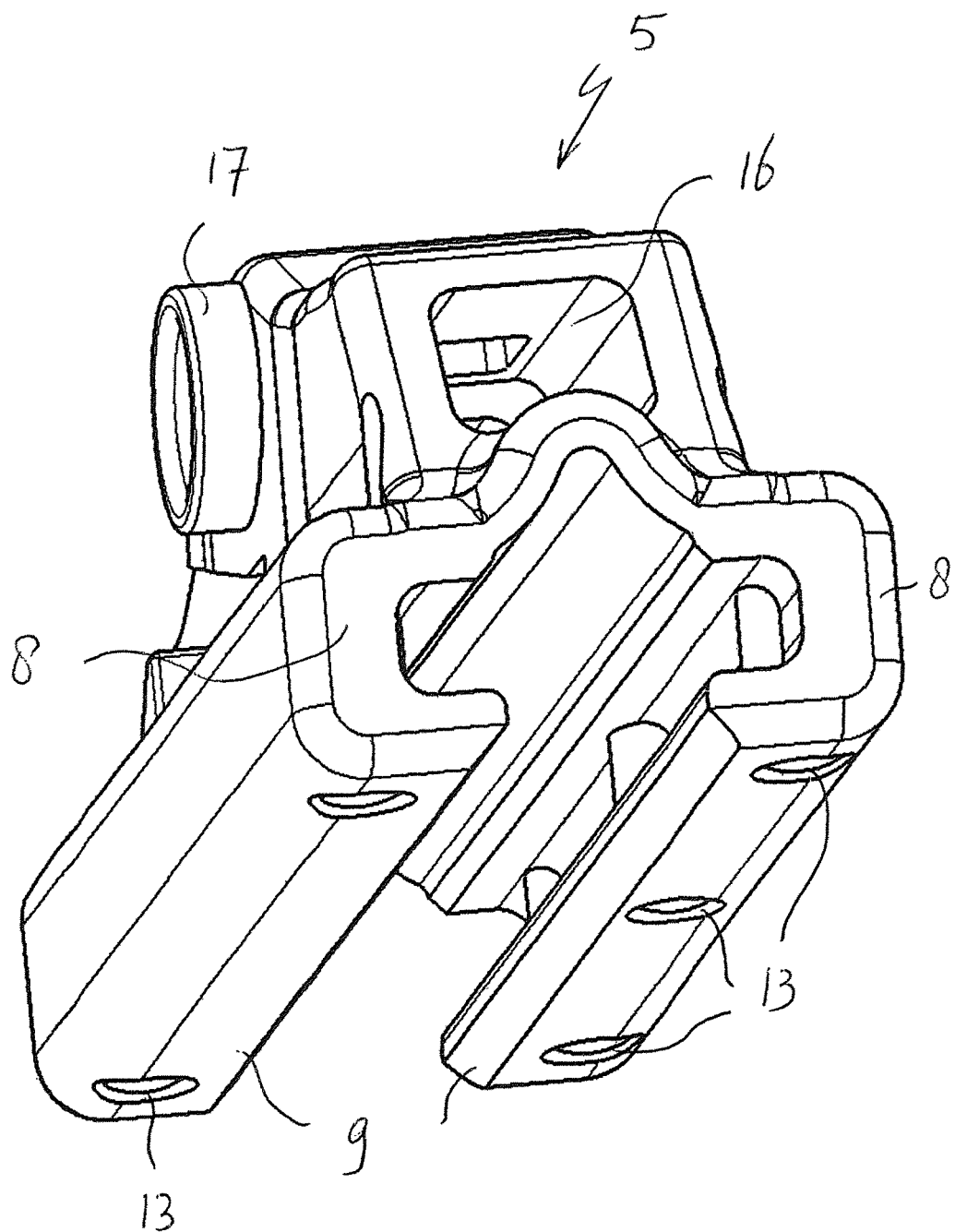
Figure 4:
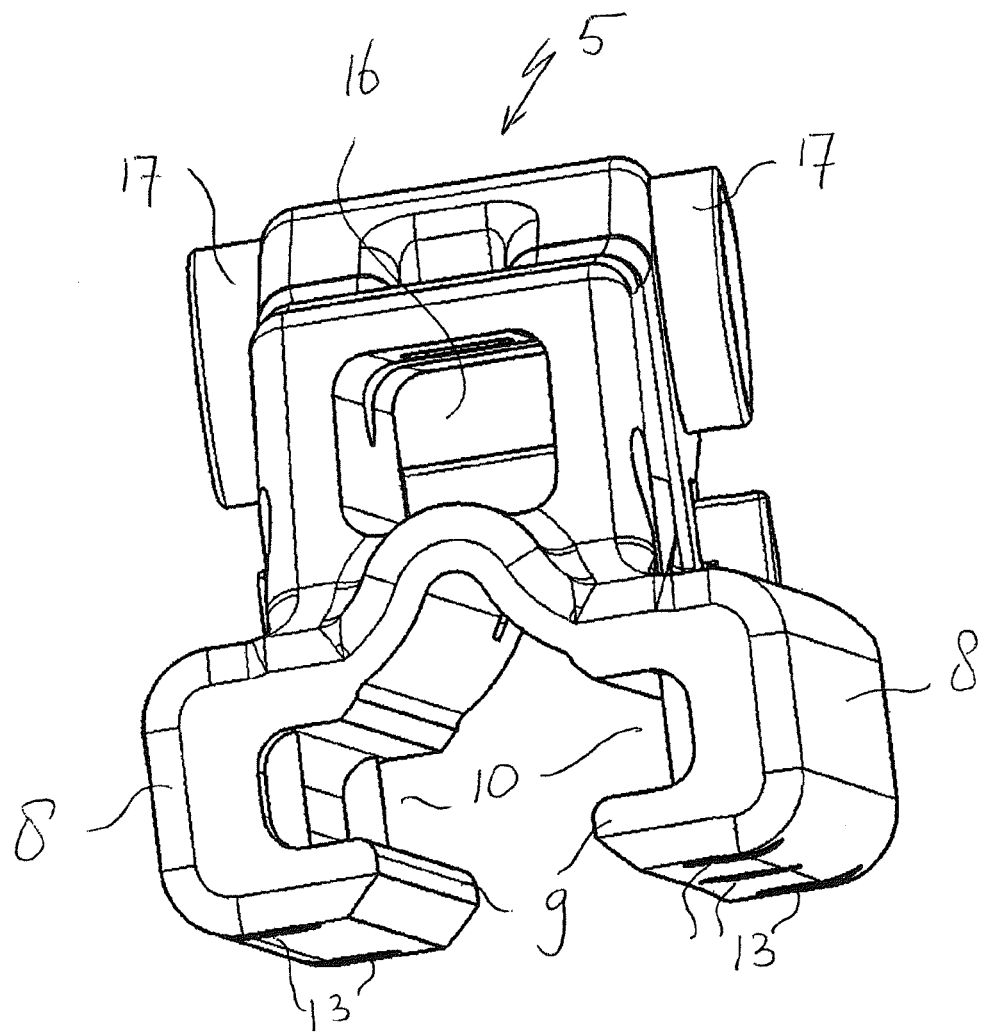

FIGS. 2 through 4 show in perspective several views of a connecting device 5 used in the windscreen wiper device 1 of FIG. 1. As mentioned earlier, this connecting device 5 has a more or less U-shaped cross-section with legs 8. Free ends 9 of the legs 8 of the U-shaped cross-section extend inwardly so as to form grooves or slits 10 for receiving longitudinal sides 11 of the wiper blade 2. The free ends 9 and parallel walls 12 of the connecting device 5 are provided with holes 13 for receiving one pin 14 of the first type and two pairs of opposite pins 15 of the second type, as will be further explained hereunder. The connecting device 5 further comprises an interior space 16 functioning as a water channel extending in longitudinal direction of the connecting device 5. During use the water channel 16 transports rain water therethrough. In other words, in use rain water is carried away from a first side of the connecting device 5 facing away from the free end of the oscillating arm to a second side of the connecting device 5 facing towards the free end of the oscillating arm. As a result of the oscillatory movement of the oscillating arm, in practice an over pressure relative to the environment exists at the location of the first side of the connecting device 5, while an under pressure relative to the environment is present at the location of the second side of the connecting device 5. Due to the over pressure and the under pressure rain water is "automatically" pressed through the water channel.

With reference to FIGS. 1 through 4 the joint part 6 is detachably connected to the connecting device 5 by engaging protrusions 17 of the connecting device 5, at the location of the pivot axis, in co-axial recesses 18 provided in the joint part 6. As shown, the protrusions 17 extend outwards on either side of the connecting device 5. The joint part 6 comprises a resilient tongue 19 extending outwardly, while the oscillating arm has a U-shaped cross-section at the location of its connection to the joint part 6, so that the tongue 19 engages in an identically shaped hole provided in a base of the U-shaped cross-section. The connecting device 5 with the wiper blade 2 is mounted onto the oscillating arm as follows. The joint part 6 being already clipped onto the connecting device 5 is pivoted relative to the connecting device 5, so that the joint part 6 can be easily slided on a free end of the oscillating arm. During this sliding movement the resilient tongue 19 is initially pushed in against a spring force and then allowed to spring back into the hole in the oscillating arm, thus snapping, that is clipping the resilient tongue 19 into the hole of the oscillating arm. This is a so-called bayonet-connection. The oscillating arm together with the joint part 6 may then be pivoted back in a position parallel to the wiper blade 2 in order to be ready for use. By subsequently pushing in again the resilient tongue 19 against the spring force (as if it were a push button), the connecting device 5 and the joint part 6 together with the wiper blade 2 may be released from the oscillating arm. Dismounting the connecting device 5 with the wiper blade 2 from the oscillating arm is thus realized by sliding the connecting device 5 and the joint part 6 together with the wiper blade 2 in a direction away from the oscillating arm.

The longitudinal strip 4, as shown in FIG. 5, is provided along an exterior edge 20 thereof with a recess 21 cooperating with the corresponding pin 14 of the first type. the recess 21 is made through a stamping operation in order to accurately control the shape of the recess 21. In mounted position the wiper blade 2 is allowed to move in longitudinal direction relative to the longitudinal strip 4 outside the location of the interconnection of the connecting device 6 and the wiper blade 2, whereas the pin 14 of the first type ensures that any such longitudinal movement of the wiper blade 2 inside the connecting device 5 is blocked. The pin 14 of the first type locally deforms the rubber. The retention of the wiper blade 2 additionally may also be the result of friction between legs 8 or the connecting device 5 and the rubber of the wiper blade 2.

Referring to FIGS. 5 and 6, in assembled position, the four pins 15 of the second type exert a controllable, predetermined pressure on the rubber material of the wiper blade 2. Thus, any lateral movement between the longitudinal strip 4 and the wiper blade 2 at the location of their interconnection and between the connecting device 5 and the wiper blade 2 at the location of their interconnection is blocked. In use, during each oscillatory movement of the oscillatory arm, the wiper blade 2 at the location outside the connection device 5 would normally suffer from the so-called "fishtailing phenomenon", wherein the wiper blade 2 on opposite sides of the connecting device 5 vibrates in an uncontrollable manner parallel to a windscreen to be wiped. Obviously, this "fishtailing phenomenon" results in deteriorated wiping properties, with all negative consequences involved, particularly at high speeds. Hence, the longitudinal strip 4 is allowed to exhibit a curvature at the location of the interconnection of the connecting device 5 and the wiper blade 2.

Experimental results have shown that the "fishtailing phenomenon" is now avoided according to the invention at least to a large extend.

The pins 15 of the second type are preferably chamfered in order not to damage the flexible material of the wiper blade 2. In the alternative or in addition thereto, the pins 15 of the second type are of a softer material than the flexible material of the wiper blade 2 in order not to damage the flexible material of the wiper blade, wherein reference is made to FIG. 7. In the alternative or in addition thereto, the pins 15 of the second type are mounted in a tube 22 of a softer material than the flexible material of the wiper blade 2 in order not to damage the flexible material of the wiper blade.

FIG. 8 shows a perspective side view of a longitudinal side 11 of the wiper blade 2, without the pins 14,15 of the first type and of the second type, but with holes 13 showing the longitudinal strip 4 and its recess 21 for the one pin of the first type.

As shown in FIGS. 9, 10 and 11, the pins 15 are movable from a first position (FIGS. 9 and 10), wherein the pins 15 in a pre-mounted position are fixed to the connecting device 5, into a second position (FIG. 11), wherein the pins 15 in a mounted position as single constructional elements are interconnecting the connecting device 5 and the flexible material of the wiper blade 2. the pins 15 can be pressed manually from the first position (FIGS. 9 and 10) into the second position (FIG. 11). In the first position shown in FIGS. 9 and 10 the pins 15 and the connecting device 5 are made in one piece. With reference to FIGS. 10 and 11 the connecting device 5 comprises a guiding channel 23 for guiding each pin 15 from the first position into the second position. As depicted, the guiding channel 23 extends in a direction perpendicular to the windscreen to be wiped. In the pre-mounted position the pins 15 are fixed to the connecting device 5 near a free end of the guiding channel 23.

It is noted that FIGS. 10 and 11 are mutually differing in the sense that in FIG. 10 the pins 15 are in the first position, whereas in FIG. 11 the pins 15 are in the second position.

The invention is not restricted to the variants shown in the drawing, but it also extends to other preferred embodiments that fall within the scope of the appended claims.

The invention claimed is:

1. A windscreen wiper device of the flat blade type, particularly for automobiles, comprising an elastic, elongated carrier element having top and bottom surfaces and laterally opposite exterior edges, as well as an elongated wiper blade of a flexible material, which can be placed in abutment with a windscreen to be wiped, which wiper blade includes at least one longitudinal groove, in which groove at least one longitudinal strip of the carrier element is disposed, which windscreen wiper device comprises a connecting device for an oscillating arm, wherein said connecting device is made of one integral unsplit piece with a pair of laterally opposed u-shaped legs that wrap about said flexible material of said wiper blade and said laterally opposite exterior cages of said carrier element, said connecting device is connected to the flexible material of said wiper blade by at least one pin of a first type and at least one pin of a second type, wherein said pin of the first type cooperates with a recess provided along an exterior edge of said longitudinal strip and extends along its length perpendicular to said bottom surface of said carrier element in order to block any movement of said wiper blade in a longitudinal direction thereof relative to said longitudinal strip; and said pin of the second type is mounted through the flexible material of said wiper blade and extends along its length perpendicular to said bottom surface of said carrier element in order to block any lateral movement of said longitudinal strip, and wherein at least one of said pins is movable relative to said connecting device from a first position, wherein said at least one of said pins in a pre-mounted position is fixed to said connecting device, into a second position, wherein said at least one of said pins in a mounted position as a single constructional element is interconnecting said connecting device and the flexible material of said wiper blade and wherein said at least one pin of said second type is different in shape and/or material than that of said at least one pin of said first type.

2. A windscreen wiper device according to claim 1, wherein said at least one of said ping can be pressed from said first position into said second position.

3. A windscreen wiper device according to claim 1, wherein in said first position said at least one of said pins and said connecting device are made in one piece.

4. A windscreen wiper device according to claim 1, wherein said connecting device comprises a guiding channel for guiding said at least one of said ping from said first position into said second position.

5. A windscreen wiper device according to claim 4, wherein said guiding channel extends in a direction at least substantially perpendicular to a pivot axis of said connecting device about which said connecting device is attachable to the arm.

6. A windscreen wiper device according to claim 4, wherein said at least one of said ping in a pre-mounted position is fixed to said connecting device near a free end of said guiding channel.

7. A windscreen wiper according to claim 4, wherein said connecting device has a substantially U-shaped cross-section, wherein free ends of said legs of said U-shaped cross-section extend inwardly so as to form grooves for receiving longitudinal sides of said wiper blade, and wherein said free ends are each provided with a corresponding said guiding channel for guiding said at least one of said ping.

8. A windscreen wiper device according to claim 1, wherein said connecting device is connected to the flexible material of said wiper blade by said at least one pin of the first type interconnecting said connecting device and said wiper blade near middle longitudinal plane of said connecting device perpendicular to the windscreen to be wiped and by two pairs of opposite pins of the second type interconnecting said connecting device and said wiper blade near outer ends of said connecting device.

9. A windscreen wiper device according to claim 1, wherein said connecting device is connected to the flexible material of said wiper blade by said at least one pin of the first type interconnecting said connecting device and said wiper blade near a middle longitudinal plane of said connecting device perpendicular to the windscreen to be wiped and by two pairs of opposite pins of the second type interconnecting said connecting device and said wiper blade near outer ends of said connecting device.

10. A windscreen wiper device according to claim 1, wherein said connecting device is connected to the flexible material of said wiper blade by one pair of opposite pins of the first type and by at least one pin of the second type interconnecting said connecting device and said wiper blade near the outer ends of said connecting device.

11. A windscreen wiper device according to claim 1, wherein said connecting device is connected to the flexible material of said wiper blade by two pairs of opposite pins of the second type interconnecting said connecting device and said wiper blade near the outer ends of said connecting device.

* * * * *